(12) United States Patent
Kraimer et al.

(10) Patent No.: US 7,374,004 B2
(45) Date of Patent: May 20, 2008

(54) INDUSTRIAL VEHICLE WITH SHAPED BATTERY

(75) Inventors: James V. Kraimer, Celina, OH (US); Adam M. Ruppert, Wapakoneta, OH (US); Peter Adelsperger, Erding (DE)

(73) Assignee: Crown Equipment Corporation, New Bremen, OH (US)

( * ) Notice: Subject to any disclaimer, the term of this patent is extended or adjusted under 35 U.S.C. 154(b) by 290 days.

(21) Appl. No.: 11/143,849

(22) Filed: Jun. 2, 2005

(65) Prior Publication Data

US 2006/0272874 A1 Dec. 7, 2006

(51) Int. Cl.
*B60R 16/04* (2006.01)
(52) U.S. Cl. .................. 180/68.5; 180/89.19; 180/65.1
(58) Field of Classification Search ............... 180/68.5, 180/65.1, 89.19
See application file for complete search history.

(56) References Cited

U.S. PATENT DOCUMENTS

| | | | |
|---|---|---|---|
| 1,875,627 A * | 9/1932 | Mancha et al. ............... 105/51 |
| 3,195,913 A | 7/1965 | Hallsworth |
| 3,254,900 A | 6/1966 | Allen |
| 3,357,513 A | 12/1967 | Sundberg |
| 3,836,401 A | 9/1974 | Niklas et al. |
| 4,026,379 A | 5/1977 | Dunn et al. |
| 4,033,424 A | 7/1977 | Evans |
| 4,117,610 A | 10/1978 | Yates |
| 4,311,205 A * | 1/1982 | Goodacre et al. .......... 180/68.5 |
| 4,991,674 A * | 2/1991 | Fullenkamp ............... 180/68.5 |
| 5,052,512 A | 10/1991 | Pakosh et al. |
| 5,297,645 A * | 3/1994 | Eckersley et al. ......... 180/68.5 |
| 5,346,035 A | 9/1994 | Ueda et al. |
| 5,441,123 A | 8/1995 | Beckley |
| 5,520,258 A | 5/1996 | Kemshall |
| 5,709,280 A | 1/1998 | Beckley et al. |
| 5,736,272 A | 4/1998 | Veenstra et al. |
| 5,921,340 A | 7/1999 | Abels |
| 6,189,636 B1 | 2/2001 | Kikukawa |
| 6,345,677 B1 | 2/2002 | Eckersley et al. |
| 6,390,764 B1 | 5/2002 | Merlo et al. |
| 6,406,812 B1 | 6/2002 | Dreulle et al. |
| 6,446,758 B1 | 9/2002 | Schatz |
| 6,494,279 B1 | 12/2002 | Hutchens |
| 6,641,951 B1 | 11/2003 | Vutetakis et al. |
| 6,755,270 B2 | 6/2004 | Saarinen |
| 6,973,986 B2 * | 12/2005 | Murase ...................... 180/68.5 |
| 7,000,716 B2 * | 2/2006 | Leifert ....................... 180/65.1 |
| 7,121,608 B2 * | 10/2006 | Billger et al. ............ 296/65.06 |
| 2003/0230920 A1 * | 12/2003 | Itou ........................ 297/344.21 |

FOREIGN PATENT DOCUMENTS

| DE | 3042956 A1 | 7/1982 |
|---|---|---|
| EP | 0936178 A1 | 8/1999 |
| EP | 1394098 A2 | 3/2004 |

* cited by examiner

*Primary Examiner*—Jeff Restifo
(74) *Attorney, Agent, or Firm*—Stevens & Showalter

(57) ABSTRACT

An industrial vehicle includes a battery that is shaped to expand or otherwise modify the space available within an operator's compartment. As a result, operator accommodations may be satisfied within the space requirements of the vehicle. The present invention further provides an industrial vehicle having an adjustable feature, such as a repositionable operator's seat and/or repositionable control element or operator control surface, and a shaped battery that enables or otherwise corresponds with the repositioning capability of the adjustable feature.

21 Claims, 6 Drawing Sheets

INDUSTRIAL VEHICLE WITH SHAPED BATTERY

BACKGROUND OF THE INVENTION

The present invention relates in general to industrial vehicles, and more particularly to industrial vehicles having a battery that is shaped to expand or otherwise modify the space available within an operator's compartment of such vehicles. The present invention further relates to industrial vehicles having an adjustable feature, such as a repositionable operator's seat and/or repositionable control element, and a battery that is shaped to enable or otherwise correspond with the repositioning capability of the adjustable feature.

Industrial vehicles such as fork lift trucks may include a rechargeable battery for powering the vehicle, e.g., as an alternative to operating under fuel-based engine power. The battery is typically configured as a relatively large, rectangular structure consisting of a plurality of individual battery cells that are electrically connected together to achieve a desired nominal voltage. In such vehicles, the battery and its associated battery container are known to consume a substantial amount of space. Thus, battery powered industrial vehicles may be larger than their engine powered counterparts, or have significantly reduced space available to accommodate an operator in an operator's compartment of the vehicle. For example, in some fork lift trucks, the battery is positioned underneath the operator's compartment, and is arranged so as to extend out towards the back of the vehicle over the rear wheel(s). Under such an arrangement, a hood or other battery access door may be provided under the operator's seat. Alternatively, the battery may be contained entirely between the front and rear wheels, e.g., in a compartment underneath the operator's seat that extends down to the vehicle frame.

However, locating the battery underneath the operator's compartment consumes a significant amount of space, thus reducing vehicle operator comfort and work ability. For example, the size of the battery may result in added operator effort in getting into and out of the vehicle due to a high entrance step. For vehicles such as fork lift trucks that perform functions requiring the operator to frequently climb into and out of the vehicle, this feature may lead to early operator fatigue and reduced operator efficiency.

Alternatively, the battery may be moved to a position within, or adjacent to, the operator's compartment, e.g., located along one side of an operator's compartment. However, relocating the battery to an area that is within or adjacent to the operator's compartment eliminates a significant amount of area that would otherwise be available for the operator. Thus, such arrangements may cramp the operator or limit the accommodations available to the user.

SUMMARY OF THE INVENTION

The present invention provides an industrial vehicle including a battery that is shaped to expand or otherwise modify the space available within an operator's compartment. As a result, operator accommodations may be satisfied within the space requirements of the vehicle. The present invention further provides an industrial vehicle having an adjustable feature, such as a repositionable operator's seat and/or repositionable control element or operator control surface, and a shaped battery that enables, or otherwise corresponds with, the repositioning capability of the adjustable feature.

For example, the industrial vehicle may comprise an operator's seat having at least one adjustable feature, such as the ability to swivel or rotate the seat, adjust the positioning of the seat in the fore and aft direction, adjust the seat back tilt, and/or adjust the positioning of the seat in a lateral (side to side) direction. A battery is provided adjacent to, or at least partially within the operator's compartment, and is shaped to correspond with at least one adjustable feature of the operator's seat. In this regard, the battery is generally nonrectangular and may be shaped so as to include an area of varied dimension, e.g., a width that is stair-stepped, tapered or otherwise includes a recessed portion. The non rectangular shape of the battery allows the battery to be positioned adjacent to, or at least partially within the operator's compartment such that space is available within the operator's compartment to accommodate the adjustable feature of the operator's seat. Also, the shape of the battery may provide clearance for the operator to adjust the operator's seat, such as by increasing the available space within the operator's compartment about the operator's seat to accommodate the legs, knees, and/or feet of an operator within at least a portion of the range of adjustment of the operator's seat. The battery may also be shaped to enable the positioning of operator controls in areas not otherwise possible with a typical, single rectangular battery. As such, the shaped battery enables the vehicle to provide additional operator accommodations and still meet the vehicle's size requirements.

The industrial vehicle may further include one or more control elements positioned on or about the operator's seat. This positioning of the control elements allows the operator to establish a work operative position regardless of the adjusted position of the operator's seat. For example, the control elements may be provided on a multifunction control handle coupled to an armrest of the operator's seat. Under such an arrangement, the control element may be repositionably moved, e.g., as the operator's seat is adjusted from a first position to a second position. Further, locating control elements on the armrest allows the controls to repositionably reside in an area above a space occupied by the battery.

BRIEF DESCRIPTION OF THE SEVERAL VIEWS OF THE DRAWINGS

The following description of the preferred embodiments of the present invention can be best understood when read in conjunction with the following drawings, where like structure is indicated with like reference numerals, and in which.

DETAILED DESCRIPTION OF THE INVENTION

In the following description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
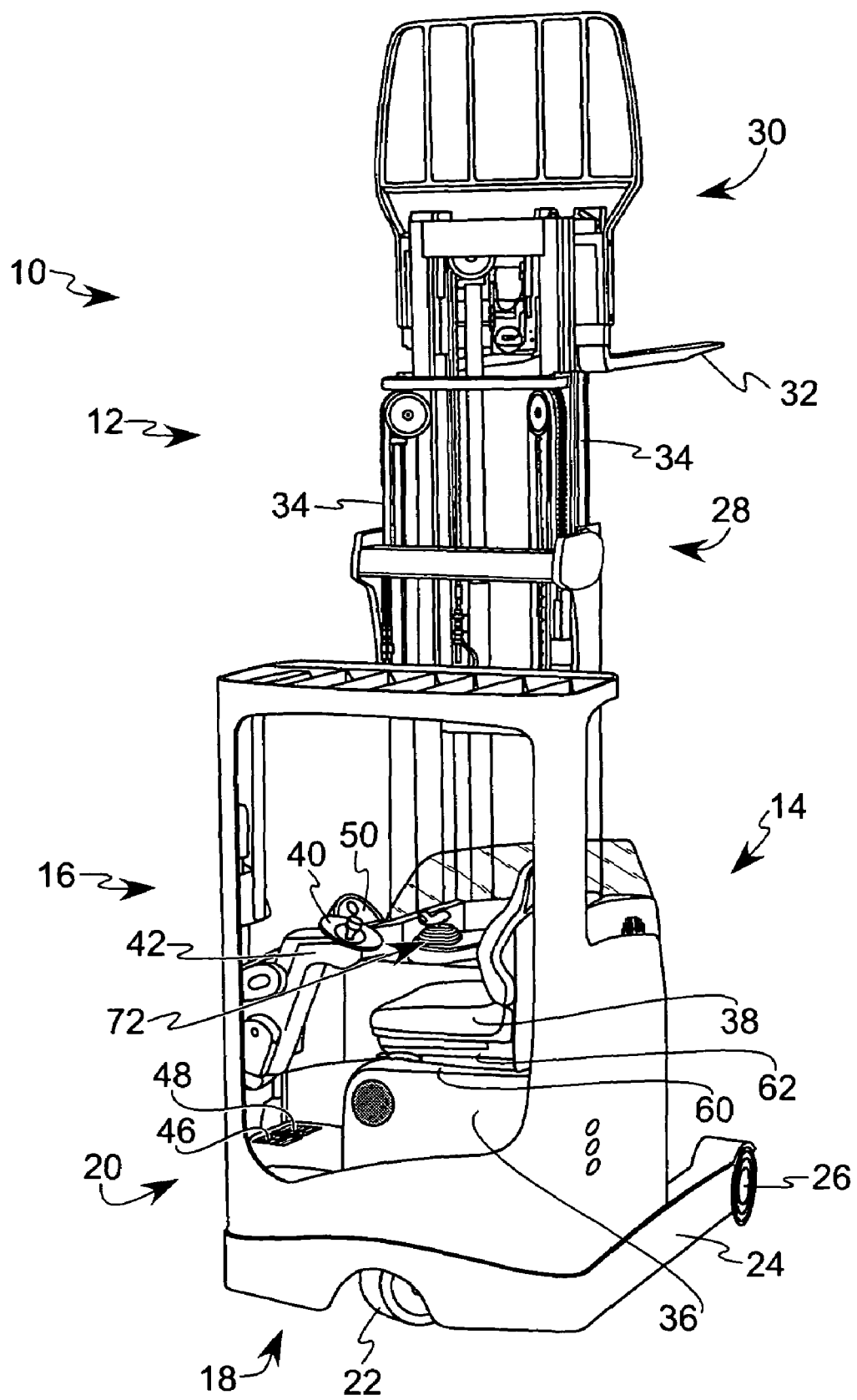
FIG. 1 is a perspective view of an exemplary industrial vehicle including an operator's compartment and a load handling assembly, which is illustrated as a mast supporting a pair of forks in a raised position.

Referring now to the drawings, and particularly to FIG. 1, an industrial vehicle 10, which is illustrated as a rider reach truck, includes a load handling assembly 12 positioned generally towards a front portion 14 of the vehicle 10 and a power unit 16 positioned generally towards a rear portion 18 of the vehicle 10. The power unit 16 includes an operator's compartment 20, a steered wheel 22 positioned generally beneath the operator's compartment 20, a pair of outriggers 24 that extend from the power unit 16 in a direction towards the front portion 14 of the vehicle 10 so as to flank either side of the load handling assembly 12 and a pair of front wheels 26, one wheel 26 coupled to each outrigger 24. The operator's compartment 20 has substantially open access thereto, e.g., via the opening from the rear portion 18 of the vehicle 10 as shown, which allows for unimpeded ingress and egress to the operator's compartment 20.

The load handling assembly 12 includes a mast 28 that extends generally vertically from the power unit 16, a fork carriage mechanism 30 supported by the mast 28 and a pair of forks 32 that are carried by the fork carriage mechanism 30. The illustrated mast 28 includes a pair of mast rails 34 defining an offset, wide view mast assembly, which allows a relatively wide visibility window inside of the pair of mast rails 34, and allows visibility to both the outriggers 24 and the forks 32. However, depending upon the vehicle 10 and the intended applications, the load handling assembly 12 may be implemented by different mast 28 and fork arrangements or other load handling structures altogether.

The vehicle 10 further comprises a motor compartment 36, which may be located, for example, underneath and/or outside of the operator's compartment 20. The motor compartment 36 houses necessary motors and drive devices (not shown), such as a traction motor provided to drive the steered wheel 22, and one or more hydraulics motors, which are provided to power hydraulics functions of the vehicle 10. The various motors and drive devices may alternatively be positioned in separate compartments within or about the power unit 16.

Figure 2:
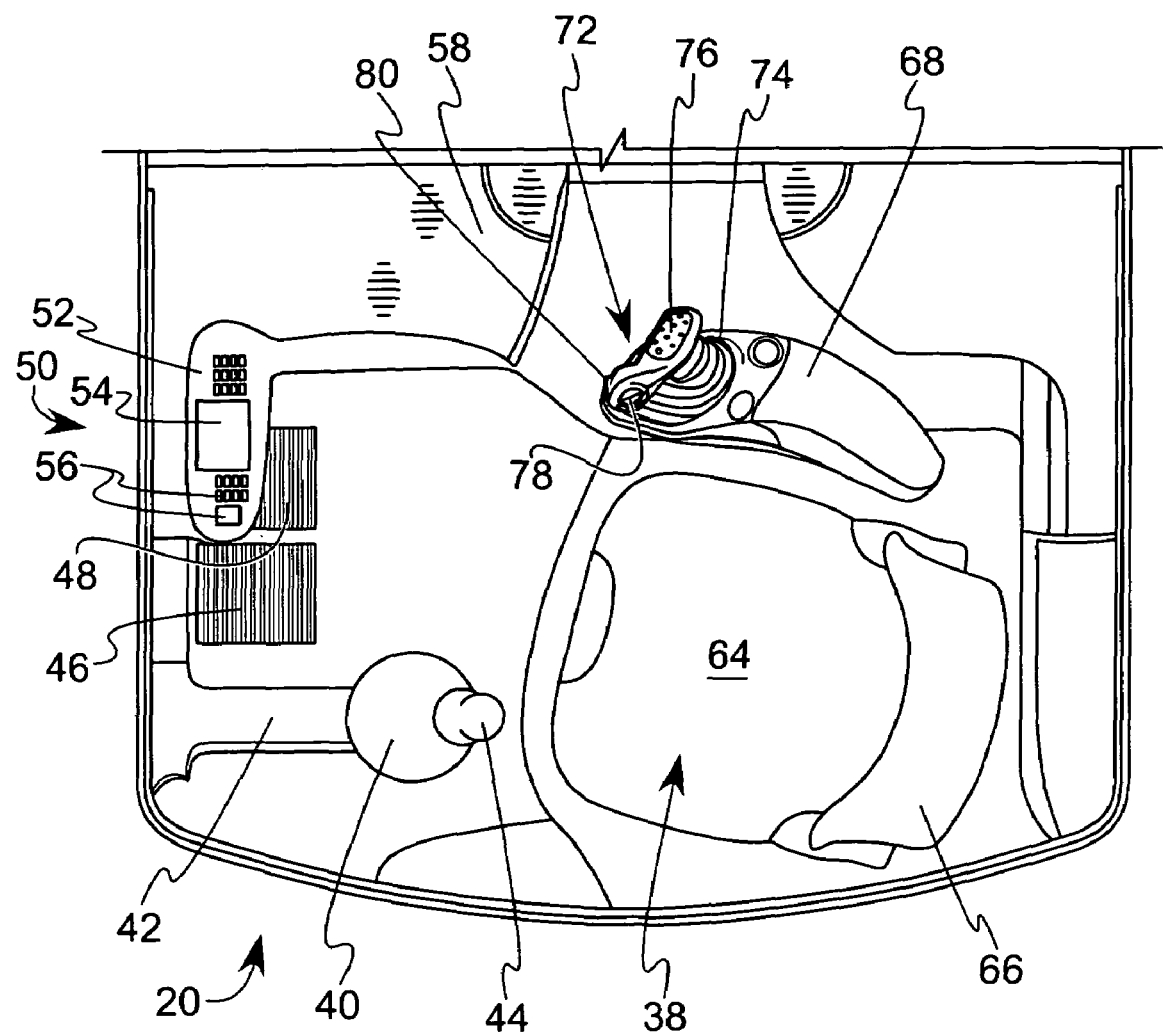
FIG. 2 is a partial top view of an operator's compartment of the vehicle illustrated in FIG. 1.

With reference to FIGS. 1 and 2, the operator's compartment 20 defines an operator's station from which an operator may drive the vehicle 10 and control the load handling and other work operative features of the vehicle 10. The operator's compartment 20 includes in general, an operator's seat 38 and a plurality of work operative controls provided for navigating the vehicle 10, operating the work operative instruments of the vehicle 10 and performing other work related tasks. Exemplary work operative controls are discussed below.

As shown, the operator's compartment 20 includes a steering tiller 40 for controlling the direction of travel of the vehicle 10. The steering tiller 40 is coupled to a steer column 42 that extends from a first control area, which is located to one side of the vehicle 10. The steer column 42 may optionally be capable of tilting or otherwise repositioning to ensure a comfortable position for an operator. The steering tiller 40 is illustrated as having a relatively small hand wheel 44, which is provided for convenience of operation. However, other steering arrangements may alternatively be implemented.

Additionally, one or more presence sensing detectors may be provided about the operator's compartment 20. As shown, a first presence sensing detector is implemented as a left foot presence pedal 46 that is positioned about the floor of the operator's compartment 20 so as to generally lie under an operator's left foot, for example, when the operator's seat 38 is in a default position and the operator is in a work operative position seated in the operator's seat 38. The presence pedal 46 may be integrated with other vehicle electronics to limit, restrict, modify or otherwise enable certain vehicle work operations, depending upon whether the presence pedal 46 detects a foot of the vehicle operator. Adjacent to the presence pedal 46 is a control pedal 48, e.g., a brake pedal arrangement that may be operated by the right foot of the operator. Alternatively, an automotive style accelerator and brake pedal arrangement can be provided.

With specific reference to FIG. 2, an operator interaction area is provided on a control surface 50 of a first panel 52 within the operator's compartment 20. As shown, the operator interaction area includes an information display 54 and a plurality of input/output (I/O) devices 56, e.g., buttons, switches, knobs and levers. The information display 54 may provide vehicle status data and operator and service technician information through a message window. Additionally, the information display 54 may provide battery discharge status, steer wheel position, travel direction indication, hour meter, fork height, load weight and other dynamic information. Additionally, the operator interaction area may provide a location for mounting an optional data terminal, camera display or other work related devices. A second panel 58 that extends across the vehicle 10 between the operator's seat 38 and the load handling assembly 12 serves as a cover to a battery compartment and corresponding shaped vehicle battery, which is described below.

Figure 3:
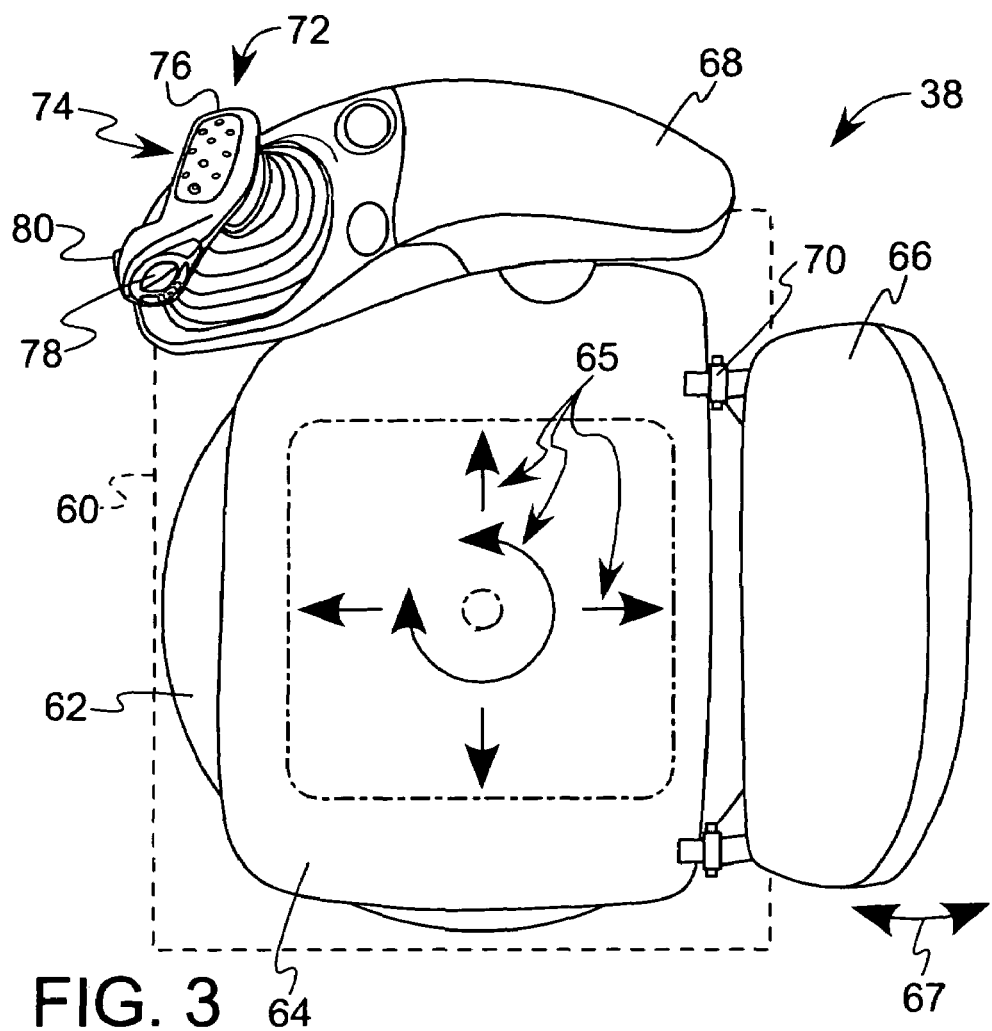
FIG. 3 is a top view of an exemplary repositionable seat of the vehicle illustrated in FIG. 1.

Referring to FIG. 3, the illustrated operator's seat 38 includes a base structure 60, an intermediate member 62, a seat bottom 64, a seat back 66 and an armrest 68. The base structure 60 may be positioned, for example, above the motor compartment 36, and serves as a mounting structure for the seat bottom 64. The intermediate member 62 allows the seat bottom 64 to be adjusted to an operator set position relative to the base structure 60. For example, the intermediate member 62 may comprise an arrangement that allows the seat bottom 64 to swivel or rotate relative to the base structure 60. The intermediate member 62 may further or alternatively allow the seat bottom 64 to move generally about a limited horizontal plane, e.g., by allowing the seat bottom 64 to transition in the fore, aft and lateral directions relative to the base structure 60 as schematically indicated by the directional arrows 65 in FIG. 3.

The operator's seat 38 may optionally include other adjustable features such as a seat back tilt arrangement 70 that allows the seat back 66 to tilt relative to the seat bottom 64 as schematically indicated by the directional arrow 67. In this regard, the seat back tilt arrangement 70 may include an optional tilt release lever for selectively enabling repositioning of the seat back 66. Alternatively, the seat back tilt arrangement 70 may be arranged so as to provide a flexible feature to the seat back 66. Under this arrangement, the seat back 66 is supported in a default, upright position. However, an operator can apply a force to temporarily tilt the seat back 66. When the operator applied tilting force is relieved, the flexible nature of the seat back tilt arrangement 70 returns the seat back 66 to its default upright position. Other seat back tilt arrangements may alternatively be implemented. Further, the operator's seat 38 may provide seat height or other suitable adjustment features. Still further, the operator's seat 38 may optionally include a locking device and corresponding seat release that allows the seat bottom 64 to be selectively locked into an operator set position relative to the base structure 60, and unlocked for repositioning. In this regard, the particular seat arrangement and the corresponding adjustable feature or features will likely vary depending upon the vehicle 10 and the applications to be performed.

Exemplary implementations of operator's seats and seat locking/release systems are set out in U.S. patent application Ser. No. 10/948,495, entitled "Seat Repositioning Device with Release on Control handle", U.S. patent application Ser. No. 10/948,500, entitled "Rotating and Swiveling Seat", U.S. patent application Ser. No. 10/948,722, entitled "Systems And Methods For Seat Repositioning", and U.S. Pat. No. 4,671,572, entitled "Adjustable Chair Having Roller Cam Adjustment Mechanism", each of which is incorporated by reference in its entirety, herein.

The operator's seat 38 further includes one or more control elements 72 that are coupled to the armrest 68. The control elements 72 may collectively provide the functionality necessary to operate the vehicle 10 and its features, including controlling navigation and/or acceleration of the vehicle 10, operation of the working implements of the vehicle 10, e.g., by controlling the height of the forks 32, the fork extension, fork tilt and/or side-shift, and/or by operating other features related to the vehicle 10 or to the performance of specific tasks associated with the vehicle 10. For example, at least one of the control elements 72 may comprise a seat adjusting element that is associated with one or more of the adjustable features of the operator's seat 38. Other controls may sound a horn or other audible or visual signal, operate a fan, communications link, light, scanner technology, or provide any other desired function necessary to perform a given task.

The exemplary control elements 72 are combined into a control area that includes a multifunction control handle 74 as shown. The exemplary control handle 74 includes a joystick 76, a thumb-operated control 78 and a button or finger operated control element 80. However, other devices may be positioned individually, or combined in one or more control areas on the armrest 68, including for example, levers, switches, jog wheels, throttles, twist grips, potentiometers, encoders and other controls. The control handle 74 enables the operator to perform several tasks from a single work operative position, without requiring large limb movements or excessive awkward adjustments of position. In an exemplary work operative position, a seated operator rests a palm of a hand upon a textured portion of the joystick 76. With the operator's palm resting on the joystick 76, the operator's thumb is oriented so as to selectively operate the thumb-operated control 78. The operator can also reach (and actuate) the button or trigger element using only a slight finger movement, by lifting and repositioning the index finger to the control element 80.

Figure 4:
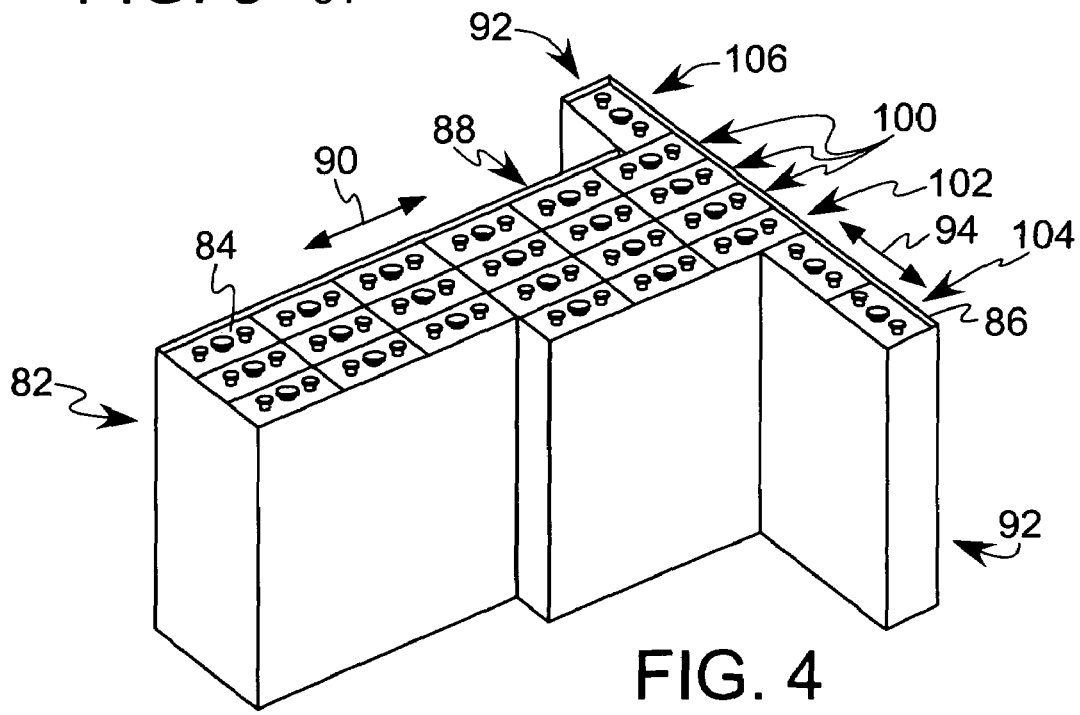
FIG. 4 is a perspective view of a shaped battery according to an embodiment of the present invention.

With reference to FIG. 4, a shaped battery 82, which powers the vehicle 10, is comprised of a plurality of battery cells 84. The battery cells 84, e.g., conventional lead storage cells, each typically produce a nominal output of two volts when suitably charged. Thus, the illustrated battery 82, which is comprised of twenty four battery cells 84, can generate a nominal output of forty-eight volts when each battery cell 84 is appropriately interconnected and properly charged. The use of conventional battery cells allows the shaped battery 82 of the present invention to utilize standard recharging methods and apparatuses that are commonly in place for traditional rectangular battery boxes. Moreover, the shaped battery 82 may utilize typical battery roll out techniques for removal of the shaped battery 82 from the vehicle 10. For example, during battery roll out, the shaped battery 82 may slide out away from the power unit 16 towards the mast 28, then to a side and away from the vehicle 10.

Additionally, while twenty four battery cells 84 are illustrated, any number of battery cells 84 may be provided, depending upon the power requirements of the particular vehicle 10. Moreover, while illustrated as comprising conventional storage cells, other battery cell configurations, including customized cell geometries, construction and/or power handling capabilities may alternatively be used.

As shown, each battery cell 84 is generally rectangular in shape. However, the battery cells 84 and the corresponding battery container 86 are arranged in a shape that corresponds to the operator's compartment 20, e.g., to enable or otherwise accommodate a space requirement of the operator's compartment. For example, the shape of the battery may provide space required by a control element, or to provide suitable available space to accommodate an adjustable feature of the operator's compartment 20, such as an adjustable or repositionable control element or an adjustable feature of the operator's seat 38. As shown, the battery 82, as a whole, takes a shape other than a single rectangular shape. The particular shape of the battery 82 may be determined based upon where the battery 82 is located within or about the operator's compartment 20, where control elements are required or desired to be located, and where operator or control element access or space is required by a particular application, as will be explained in greater detail below.

As FIG. 4 illustrates, when assembling the battery cells 84 in the battery container 86, the individual battery cells 84 need not be oriented in exactly the same direction. That is, even when the battery 82 is constructed from conventionally sized and shaped battery cells 84, those battery cells 84 may be arranged in any suitable orientation to achieve the desired result. As the exemplary battery arrangement illustrates, a first plurality 88 of the battery cells 84 are oriented in a first direction 90 and the remainder 92 of the battery cells 84 are oriented in a second direction 94 that is orthogonal to the first direction 90. Moreover, while the entirety of the battery cells 84 are illustrated as being arranged in a single battery container 86, the battery 82 may alternatively be comprised of two or more separate battery containers 86 so long as suitable electrical interconnection can be made between the battery cells 84 in each of the separate battery containers 86.

Figure 5:
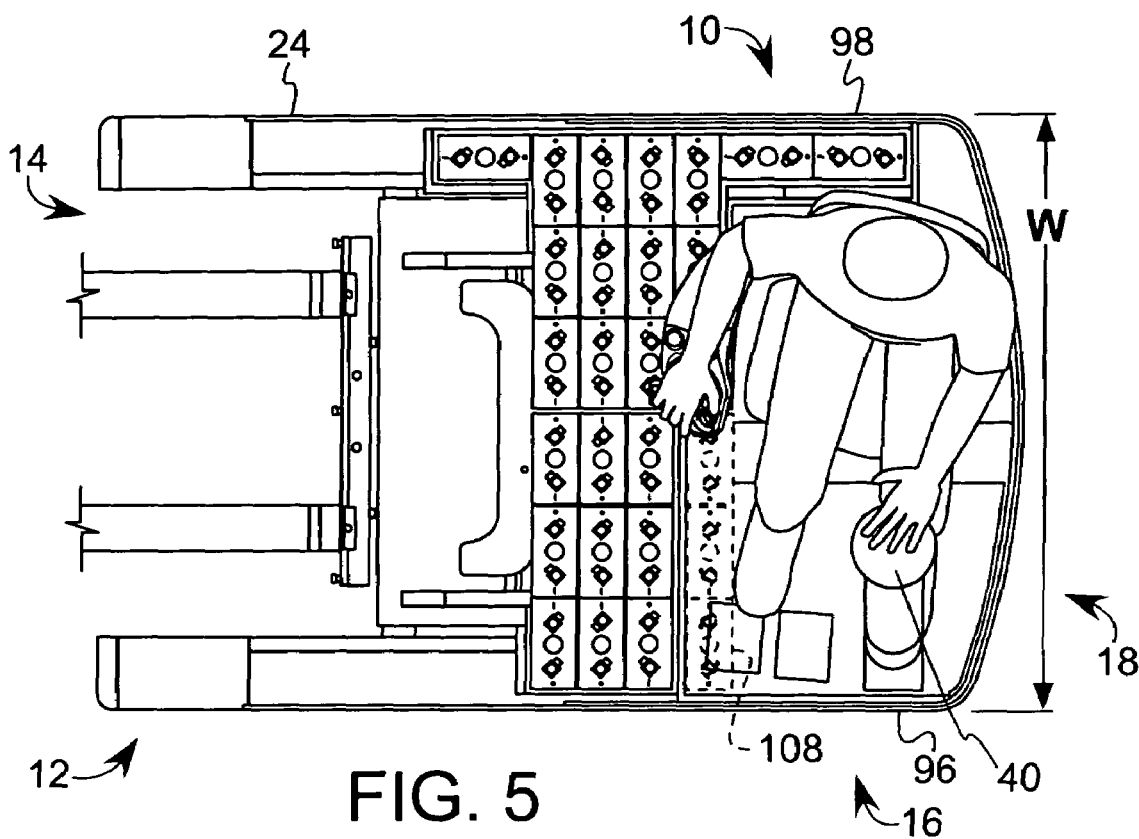
FIG. 5 is a top view of the vehicle of FIG. 1 having a console portion of the operator's compartment and part of the mast removed to illustrate the positioning of the battery of FIG. 4, when such a battery configuration is installed in the vehicle, wherein the operator's seat is in a first position.
Figure 6:
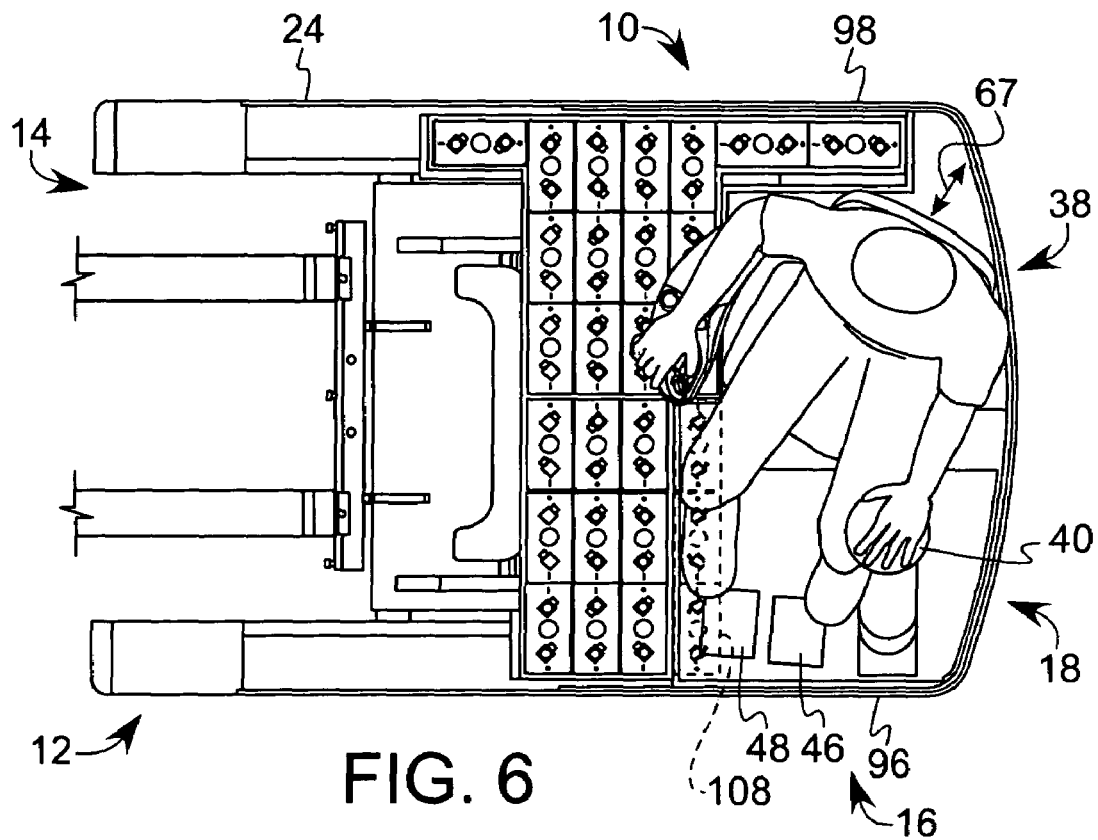
FIG. 6 is a top view of the vehicle of FIG. 1 having a console portion of the operator's compartment and part of the mast removed to illustrate the positioning of the battery of FIG. 4, when such a battery configuration is installed in the vehicle, wherein the operator's seat is in a second position.

With reference to FIGS. 5 and 6, the vehicle 10 is illustrated with several vehicle components removed, including the second panel 58, which serves as a battery cover, to illustrate the orientation and positioning of the battery 82 within the vehicle 10. The vehicle 10 has a width W that spans between a first side 96 of the vehicle 10 and a second side 98 of the vehicle 10. As illustrated, the first side 96 of the vehicle 10 also defines an operator facing side of the vehicle 10, and the second side 98 defines an operator back side when an operator is positioned in the operator's seat 38. The battery 82 and corresponding battery container 86 are oriented between the operator's seat 38 and the load handling assembly 12.

With reference to FIGS. 4-6, the battery 82 is arranged generally, in a "T" shaped configuration. That is, the battery cells 84 are arranged in a plurality of rows and/or columns including three rows, designated by the reference numeral 100, that each contains six battery cells 84. Each row 100 spans substantially the width W of the vehicle 10. A fourth row 102 containing three battery cells 84 is positioned between the rows 100 and the operator's seat 38 adjacent to the second side 98 of the vehicle 10. A first column 104, which includes two battery cells 84, extends in a direction that is orthogonal to the rows 100, 102 behind the operator's seat 38 adjacent to the second side 98 of the vehicle 10. Further, a battery cell 84 is positioned in a second column 106 that is orthogonal to the rows 100 and is located proximate to the load handling assembly 12 and adjacent to the second side 98 of the vehicle 10. As illustrated, the battery cell 84 of the second column 106 is outside of the operator's compartment 20 and is positioned generally over one of the outriggers 24.

Referring to FIG. 5, when an operator is seated in the operator's seat 38 and is positioned in a first position facing generally towards the first side 96 of the vehicle 10, the necessary work operative controls, including the control handle 74 on the armrest 68 of the operator's seat 38, the steering tiller 40, and foot pedals are all readily accessible, e.g., from a single, work operative position. The battery 82 does not impede or otherwise obstruct operation of the vehicle 10. Also, as illustrated, the control handle 74 and armrest 68 of the operator's seat 38 extend at least partially over the battery container 86, thus utilizing available vertical space in the operator's compartment 20. This further allows flexibility in positioning the operator's seat 38 relative to the battery 82.

The operator's seat 38 may be configured to swivel or rotate from the first position towards the load handling assembly 12, from the first position towards the back side of the operator's compartment 20, or from the first position to either direction. Referring to FIG. 6, the illustrated operator's seat 38 is repositioned, e.g., by rotating or swiveling the seat bottom 64 to a second position, which is towards the load handling assembly 12 as shown. Such may be desirable, for example, where an operator wishes to change a view of the forks 32, the outriggers 24, or work area in the forward direction of the load handling assembly 12.

As the operator's seat 38 is repositioned, the control elements on the armrest 68 maintain their relative position with respect to the operator as the armrest 68 pivots with the seat bottom 64. Accordingly, the operator maintains a work operative position throughout the range of adjustments of the operator's seat 38. The height of the battery 82 allows a clearance from the top of the battery 82, and more particularly, from the top of the second panel 58, to the armrest 68 of the operator's seat 38. Accordingly, as the seat bottom 64 is repositioned, the armrest 68 and controls on the control handle 74 swing out over the battery 82. As an alternative, the armrest 68 may be configured so as to not transition with regard to movement of the seat bottom 64, or the armrest 68 can be independently adjustable with respect to the seat bottom 64.

Moreover, the shape of the battery 82 provides an area of reduced dimension, e.g., a "stair step", taper, or other dimension changing characteristic that corresponds, enables, or otherwise accommodates the adjustable feature of the operator's seat 38. In the exemplary battery shape, the fourth row 102 of battery cells 84, which is closest to the operator's seat 38, is comprised of less battery cells 84 than the rows 100 of battery cells 84, so as to provide greater available space in the operator's compartment 20 for the operator's body, i.e., the feet, legs and/or knees of the operator, without providing undue interference with structures in the operator's compartment 20. Notably, a conventional battery arrangement, which is indicated with phantom lines 108, would prevent the ability of the operator's seat 38 from being adjustable as illustrated, because the battery 82 would interfere with the legs, feet and/or knees of the operator when the operator's seat 38 is repositioned from a default position facing the first side 96 of the vehicle.

Further, additional adjustment features and/or operator's seat repositioning capabilities may be operated concomitantly with the rotation of the operator's seat. As noted above, the operator's seat 38 may include a seat back tilt arrangement 70, which is best seen in FIG. 3. When in either the first or second positions, the operator can adjust the seat back tilt, as represented by the directional arrow 67, to further change the operator's position, e.g., to adjust or modify the field of view. For example, the operator may rotate the operator's seat 38 to the second position to put away a load carried on the forks 32 of the vehicle 10. As the forks 32 are raised vertically up the mast 28, the operator can follow the movement of the forks 32 by tilting the seat back 66, thus creating a comfortable posture for the vehicle operator over a range of vehicle operations. As yet another example, the operator's seat may be adjusted in the fore, aft and/or lateral directions in addition to, or as an alternative to rotating the operator's seat.

Figure 7:
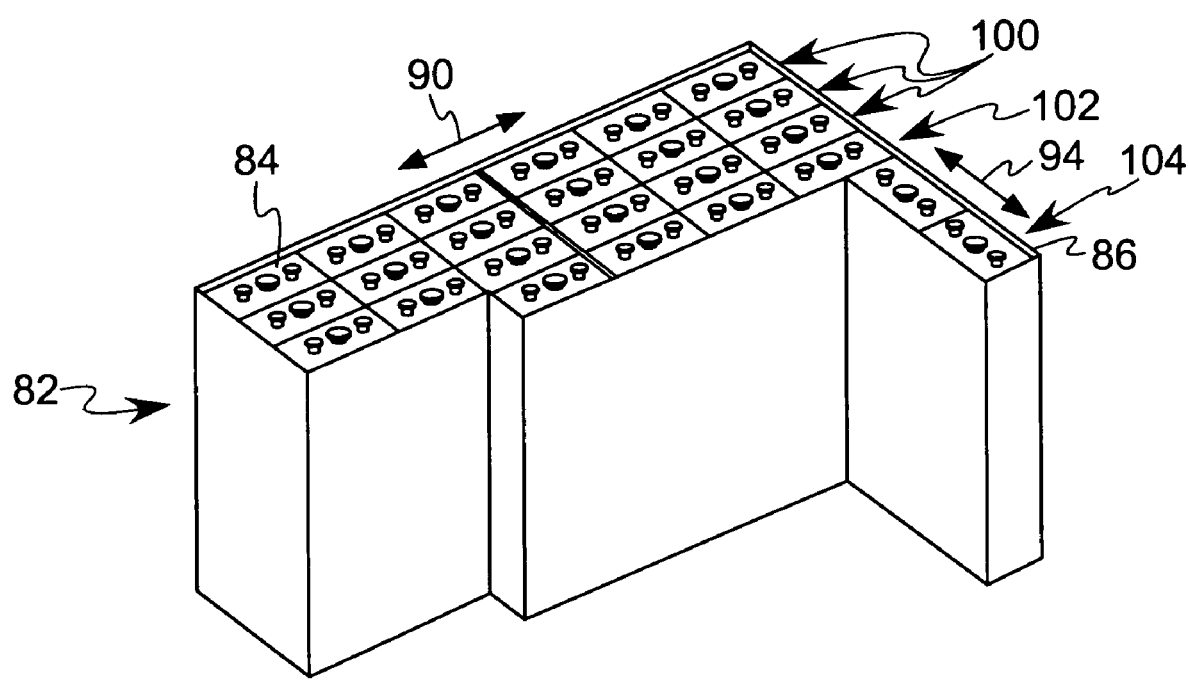
FIG. 7 is a perspective view of a shaped battery according to another embodiment of the present invention.
Figure 8:
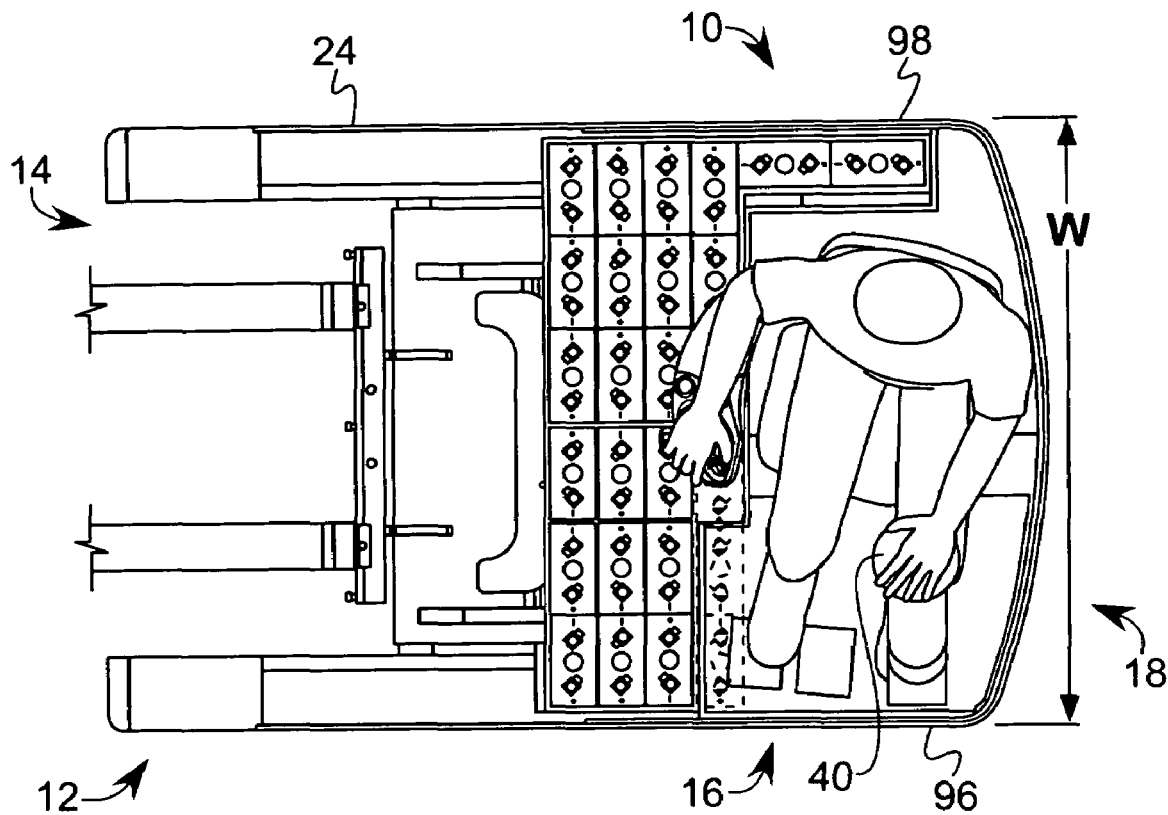
FIG. 8 is a top view of the vehicle of FIG. 1 having a console portion of the operator's compartment and part of the mast removed to illustrate the positioning of the battery of FIG. 7, when such a battery configuration is installed in the vehicle, wherein the operator's seat is in a first position.
Figure 9:
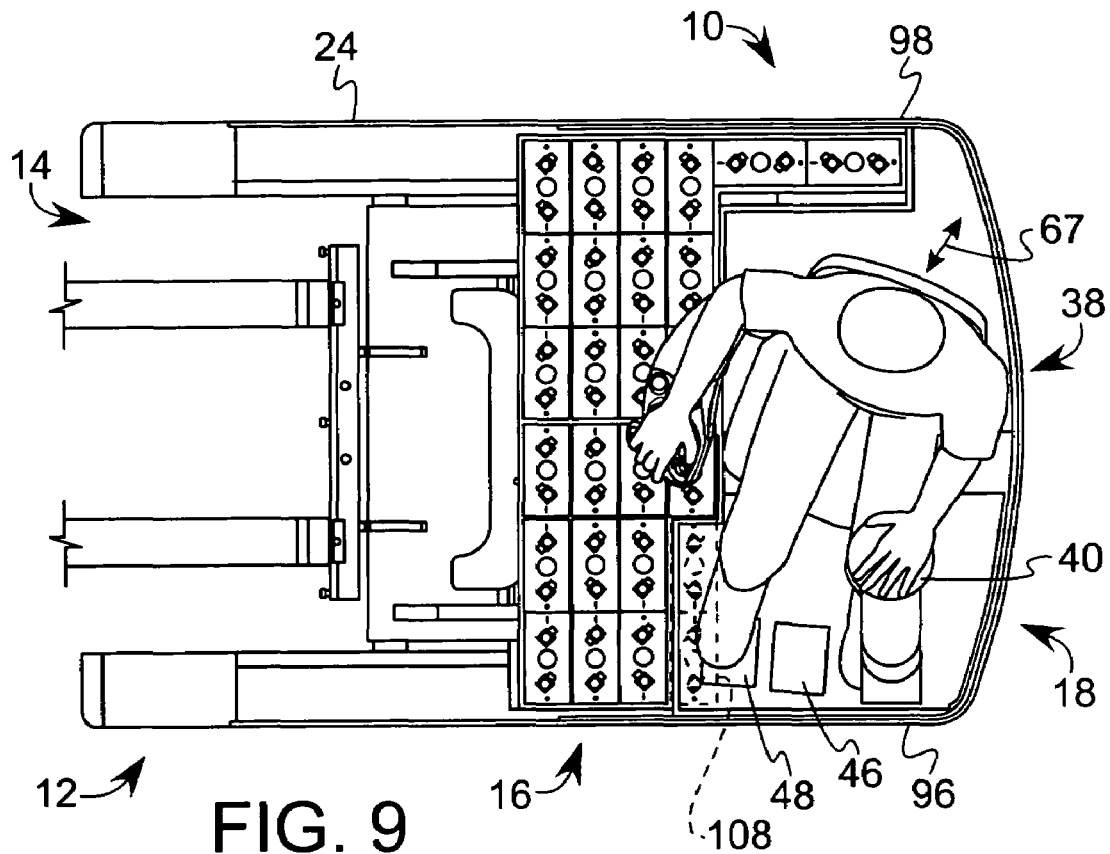
FIG. 9 is a top view of the vehicle of FIG. 1 having a console portion of the operator's compartment and part of the mast removed to illustrate the positioning of the battery of FIG. 7, when such a battery configuration is installed in the vehicle, wherein the operator's seat is in a second position.

With reference to FIGS. 7-9, the battery 82 may alternatively take a configuration that is generally "L" shaped. The "L" shape may be desirable, for example, where the space requirements of the operator's compartment 20 permits such a shape while maintaining the desired vehicle functionality, e.g., clearance between the battery 82 and a reasonable range of positions of the operator's seat 38. As best seen in FIGS. 8 and 9, the shape of the battery 82 provides an area of reduced dimension, e.g., a "stair step", taper, or other dimension changing characteristic that corresponds, enables, or otherwise accommodates the adjustable feature of the operator's seat 38. In the exemplary battery shape, two battery cells 84 that would otherwise be positioned proximate to the knees of the operator are relocated to a position behind the operator's seat. This arrangement provides greater available space in the operator's compartment 20 for the body, e.g., the feet, legs and/or knees of the operator without providing undue interference with structures in the operator's compartment 20. Notably, a conventional battery arrangement, which is indicated with phantom lines 108, would prevent the ability of the operator's seat 38 from being adjustable as illustrated in FIG. 9 because the battery 82 would interfere with the legs, feet and/or knees of the operator when the operator's seat 38 is repositioned from a default position facing the first side 96 of the vehicle.

Further, the "L" shape may present a trade-off where each battery cell 84 is to be maintained within the area confined within the operator's compartment 20 or to a space between the operator's compartment 20 and the load handling assembly 12, e.g., where a battery cell 84 cannot suitably be positioned over an outrigger or other vehicle component. In this regard, the shape of the battery 82 is similar to that of the "T" shaped battery 82, except that the battery cell 84, which is positioned over an outrigger in FIGS. 5 and 6, is moved to a position in the fourth row 102 of battery cells 84.

While the present invention has been described generally in terms of a "T" and an "L" shaped battery 82, other reasonable battery shapes and configurations are possible. For example, the number of required battery cells 84, the size of the vehicle 10, the location of available space within the operator's compartment, and the range or degree of adjustment of the operator's seat 38 or adjustable control elements may affect the positioning of each battery cell 84. Moreover, in some instances, the construction of the particular vehicle 10 may or may not allow one or more battery cells 84 to be positioned outside of the operator's compartment 20, e.g., by positioning one or more battery cells 84 over outriggers 24 or other suitable positions. That is, the battery 82 may be shaped to conform to the requirements of the operator's compartment by providing a nonrectangular structure, or by breaking the battery up into two or more components that are spaced apart and independently positioned.

Still further, it may not always be practical or feasible to achieve a perfect degree of clearance or an ideal amount of free space within the operator's compartment for every operator with respect to battery cell placement. For example, with reference to FIG. 6, if a greater degree of rotation of the operator's seat is desired, it may be impractical to attempt to reshape the battery 82, e.g., by moving one or more of the cells in rows 100 or 102, because the available space is already fully utilized. Regardless, by providing a battery 82 of a nonrectangular shape that is suitably positioned within or adjacent to the operator's compartment, e.g., between the operator's compartment and the load handling assembly of the vehicle, the battery shape accommodates the operator seated in the operator's seat in either of the first or second positions. Moreover, the operator accommodations are achieved without resort to relocating the battery to an area underneath the operator's compartment, thus maintaining a relatively low floor and ease of access to the operator's compartment.

Having described the invention in detail and by reference to preferred embodiments thereof, it will be apparent that modifications and variations are possible without departing from the scope of the invention defined in the appended claims.

What is claimed is:

1. An industrial vehicle comprising:
   a load handling assembly;
   a power unit comprising an operator's compartment;
   an operator's seat within said operator's compartment, said operator's seat having an armrest having a multifunction control handle positioned thereon and at least one adjustable feature; and
   a battery positioned at least partially between said operator's seat and said load handling assembly, said battery having a non-rectangular shape that corresponds to said adjustable feature of said operator's seat wherein:
   said battery includes at least one portion of reduced dimension that maintains a predetermined amount of leg room for an operator seated in said operator's seat as said operator's seat is adjusted from a first position to a second position and said multifunction control handle extends over said battery container when said operator's seat is adjusted to at least said second position.

2. The industrial vehicle according to claim 1, wherein said battery is generally "T" shaped.

3. The industrial vehicle according to claim 1, wherein said battery is generally "L" shaped.

4. The industrial vehicle according to claim 1, wherein said battery is shaped so as to extend partially behind said operator's seat and partially between said operator's seat and said load handling assembly.

5. The industrial vehicle according to claim 1, wherein said battery extends partially outside of said operator's compartment.

6. The industrial vehicle according to claim 1, wherein said battery extends at least partially outside of said operator's compartment and generally over an outrigger of said industrial vehicle.

7. The industrial vehicle according to claim 1, wherein:
   said operator's seat is rotatable from a first position to a second position; and
   said operator's seat further comprises an armrest having at least one control element thereon, said armrest arranged so as to rotate with said operator's seat in an area generally above a portion of said battery.

8. The industrial vehicle according to claim 1, wherein said battery is positioned within said power unit so as to extend in the direction of at least two sides of said operator's seat.

9. The industrial vehicle according to claim 1, wherein said operator's seat is rotatable from a first position to a second position, and wherein said battery is configured with at least one portion of reduced dimension to accommodate an operator in both said first and second directions.

10. The industrial vehicle according to claim 9, wherein said operator's seat further comprises a seat back tilt arrangement that allows a seat back of said operator's seat to be selectively tilted when said operator's seat is rotated to said second position.

11. The industrial vehicle according to claim 1, wherein said battery is further positioned at least partially within said power unit adjacent to a first sidewall of said operator's compartment.

12. An industrial vehicle comprising:
    a load handling assembly;
    a power unit comprising an operator's compartment;
    an operator's seat within said operator's compartment that is rotatable from a first position to a second position; and
    a battery positioned and shaped so as to extend at least partially between said operator's seat and said load handling assembly, said battery further having a shape including an area of reduced dimension so that when said battery is suitably positioned within said vehicle, said area of reduced dimension provides space to accommodate an operator seated in said operator's seat in either of said first or second positions.

13. The industrial vehicle according to claim 12, wherein at least a portion of said battery further extends over an outrigger of said vehicle.

14. The industrial vehicle according to claim 12, wherein said operator's seat further comprises a seat back tilt arrangement that allows a seat back of said operator's seat to be selectively tilted when said operator's seat is rotated to said second position.

15. The industrial vehicle according to claim 12, wherein said battery is further positioned and shaped so as to extend partially behind said operator's seat.

16. The industrial vehicle according to claim 12, wherein said battery is further positioned at least partially within said power unit adjacent to a first sidewall of said operator's compartment.

17. A industrial vehicle comprising:
an operator's compartment;
an operator's seat positioned within said operator's compartment, said operator's seat configured to be adjustable at least from a first position to a second position, said operator's seat further including an armrest having at least one control element thereon, said armrest configured to adjust in position as said operator's seat is adjusted from said first position to said second position; and
a battery container having a nonrectangular shape for housing a battery, said battery container positioned at least partially within said operator's compartment and having at least one area of reduced dimension that maintains a predetermined clearance from said operator's seat regardless of whether said seat is in said first or second positions, wherein said armrest is positioned at least partially over said battery container when said operator's seat is in at least one of said first and second positions.

18. The industrial vehicle according to claim 17, wherein said battery container further extends at least partially outside of said operator's compartment.

19. The industrial vehicle according to claim 18, wherein said battery container extends out generally over an outrigger of said industrial vehicle.

20. The industrial vehicle according to claim 17, wherein said battery container extends generally on at least two sides of said operator's seat.

21. The industrial vehicle according to claim 17, wherein said operator's seat further comprises a seat back tilt arrangement that allows a seat back of said operator's seat to be selectively tilted when said operator's seat is rotated to said second position.

* * * * *

UNITED STATES PATENT AND TRADEMARK OFFICE
CERTIFICATE OF CORRECTION

| | | |
|---|---|---|
| PATENT NO. | : 7,374,004 B2 | Page 1 of 1 |
| APPLICATION NO. | : 11/143849 | |
| DATED | : May 20, 2008 | |
| INVENTOR(S) | : James V. Kraimer et al. | |

It is certified that error appears in the above-identified patent and that said Letters Patent is hereby corrected as shown below:

In the Claims:

Col. 11, line 8, claim 17, "A industrial vehicle comprising" should read --An industrial vehicle comprising;--

Signed and Sealed this

Twenty-first Day of October, 2008

JON W. DUDAS
*Director of the United States Patent and Trademark Office*